US011269952B1

(12) United States Patent
Sun et al.

(10) Patent No.: US 11,269,952 B1
(45) Date of Patent: Mar. 8, 2022

(54) TEXT TO MUSIC SELECTION SYSTEM

(71) Applicant: Meta Platforms, Inc., Menlo Park, CA (US)

(72) Inventors: Ray Sun, Menlo Park, CA (US); Bokai Cao, Fremont, CA (US); Parth Popatlal Detroja, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/574,376

(22) Filed: Sep. 18, 2019

Related U.S. Application Data

(60) Provisional application No. 62/871,217, filed on Jul. 8, 2019.

(51) Int. Cl.
| | | |
|---|---|---|
| *G06F 3/048* | (2013.01) | |
| *G06F 16/635* | (2019.01) | |
| *G06F 16/68* | (2019.01) | |
| *G06F 16/638* | (2019.01) | |
| *G06F 16/9536* | (2019.01) | |
| *G06N 3/04* | (2006.01) | |

(52) U.S. Cl.
CPC ......... *G06F 16/635* (2019.01); *G06F 16/639* (2019.01); *G06F 16/686* (2019.01); *G06F 16/9536* (2019.01); *G06N 3/04* (2013.01)

(58) Field of Classification Search
None
See application file for complete search history.

(56) References Cited

U.S. PATENT DOCUMENTS

| | | |
|---|---|---|
| D392,267 S | 3/1998 | Mason et al. |
| D472,902 S | 4/2003 | Nashida et al. |
| D559,258 S | 1/2008 | Kita et al. |
| D588,151 S | 3/2009 | Okada |
| D606,080 S | 12/2009 | Marchie et al. |
| D616,463 S | 5/2010 | Barcheck et al. |
| D658,203 S | 4/2012 | Hally et al. |
| 8,572,169 B2 | 10/2013 | Partovi et al. |
| D696,269 S | 12/2013 | Hyunjung et al. |
| D713,851 S | 9/2014 | Wood |
| D715,314 S | 10/2014 | Wood |

(Continued)

OTHER PUBLICATIONS

Zhang Yichi, Siamese Style Convolution Neural Networks for Sound Search by Vocal Imitation, Sep. 3, 2018, IEEE/ACM Transactions on Audio, Speech, and Language Processing (vol. 27 , Issue: 2 , Feb. 2019 ) (Year: 2018).*

(Continued)

*Primary Examiner* — William C Trapanese
(74) *Attorney, Agent, or Firm* — FisherBroyles, LLP

(57) ABSTRACT

Systems and methods for text-based music selection through a music service may include (1) determining that a user of a social media application may be interested in sharing, via the social media application, music that relates to one or more key words, (2) providing the user with a music recommendation that relates to the one or more key words, (3) receiving input from the user accepting the music recommendation, and (4) in response to receiving the input, sharing the music composition via the social media application. Various other methods, systems, and computer-readable media are also disclosed.

20 Claims, 5 Drawing Sheets

(56) References Cited

U.S. PATENT DOCUMENTS

| | | | |
|---|---|---|---|
| D716,822 S | 11/2014 | Wood | |
| D723,044 S | 2/2015 | Park | |
| 8,971,623 B2 | 3/2015 | Gatt et al. | |
| D738,889 S | 9/2015 | Balles et al. | |
| 9,171,095 B1 | 10/2015 | Bilinski et al. | |
| D759,680 S | 6/2016 | Behar | |
| D760,267 S | 6/2016 | Butcher et al. | |
| D760,759 S | 7/2016 | Butcher et al. | |
| D761,268 S | 7/2016 | Oh et al. | |
| D763,904 S | 8/2016 | Knapp et al. | |
| D767,622 S | 9/2016 | Lee et al. | |
| D770,495 S | 11/2016 | Knapp | |
| D770,499 S | 11/2016 | Rodriguez | |
| D770,500 S | 11/2016 | Rodriguez | |
| D773,526 S | 12/2016 | Butcher et al. | |
| D773,527 S | 12/2016 | Butcher et al. | |
| D773,534 S | 12/2016 | Yuk et al. | |
| D774,053 S | 12/2016 | Kim et al. | |
| D792,445 S | 7/2017 | Sun | |
| D792,453 S | 7/2017 | Butcher et al. | |
| D794,663 S | 8/2017 | Sakuma | |
| D803,239 S | 11/2017 | Yuk et al. | |
| D814,515 S | 4/2018 | Guzman et al. | |
| D819,683 S | 6/2018 | Zhang et al. | |
| D829,759 S | 10/2018 | Clapper et al. | |
| D831,062 S | 10/2018 | Chen | |
| D831,066 S | 10/2018 | Takita et al. | |
| 10,175,757 B2 | 1/2019 | Missig et al. | |
| 10,270,983 B1 | 4/2019 | Van Os et al. | |
| D851,111 S | 6/2019 | Dye et al. | |
| D852,210 S | 6/2019 | Wei | |
| D853,410 S | 7/2019 | Barnett et al. | |
| 10,490,026 B2 | 11/2019 | Bryant et al. | |
| D868,811 S | 12/2019 | Jeon et al. | |
| 10,496,705 B1 | 12/2019 | Irani et al. | |
| D874,497 S | 2/2020 | Krenkler et al. | |
| D874,498 S | 2/2020 | Krenkler et al. | |
| D874,499 S | 2/2020 | Krenkler et al. | |
| D874,500 S | 2/2020 | Krenkler et al. | |
| D877,193 S | 3/2020 | Li et al. | |
| 10,623,621 B2 | 4/2020 | Li et al. | |
| D889,478 S | 7/2020 | Rotgans et al. | |
| D890,188 S | 7/2020 | Anno et al. | |
| D892,855 S | 8/2020 | Liu | |
| D895,649 S | 9/2020 | Jetly et al. | |
| 10,783,320 B2 | 9/2020 | Jon et al. | |
| 10,803,160 B2 | 10/2020 | Tussy | |
| D900,845 S | 11/2020 | Tomori | |
| D902,242 S | 11/2020 | Assaf et al. | |
| 10,911,504 B1 | 2/2021 | Paul | |
| 2005/0038819 A1* | 2/2005 | Hicken | G06F 16/683 |
| 2008/0122796 A1 | 5/2008 | Jobs et al. | |
| 2009/0182736 A1* | 7/2009 | Ghatak | G06Q 30/02 |
| 2009/0262087 A1 | 10/2009 | Kim | |
| 2009/0319356 A1 | 12/2009 | Spitzer et al. | |
| 2010/0049702 A1* | 2/2010 | Martinez | H04L 51/00 |
| | | | 707/769 |
| 2010/0192105 A1 | 7/2010 | Kim et al. | |
| 2011/0267530 A1 | 11/2011 | Chun | |
| 2012/0054666 A1 | 3/2012 | Baird-Smith et al. | |
| 2012/0303711 A1 | 11/2012 | Park | |
| 2012/0323938 A1 | 12/2012 | Skeen et al. | |
| 2013/0073983 A1 | 3/2013 | Rasmussen et al. | |
| 2013/0182138 A1 | 7/2013 | Cho | |
| 2013/0198268 A1* | 8/2013 | Hyman | H04L 65/4092 |
| | | | 709/203 |
| 2013/0218721 A1 | 8/2013 | Borhan et al. | |
| 2014/0031961 A1 | 1/2014 | Wansley et al. | |
| 2015/0127748 A1* | 5/2015 | Buryak | G06F 16/9535 |
| | | | 709/206 |
| 2015/0148106 A1 | 5/2015 | Choi et al. | |
| 2015/0186454 A1 | 7/2015 | Kim | |
| 2015/0264169 A1 | 9/2015 | Yim et al. | |
| 2016/0034970 A1 | 2/2016 | Musil et al. | |
| 2016/0205340 A1 | 7/2016 | Jang et al. | |
| 2016/0226804 A1* | 8/2016 | Hampson | H04L 51/18 |
| 2016/0292269 A1 | 10/2016 | O'Driscoll et al. | |
| 2017/0068910 A1 | 3/2017 | Burroughs | |
| 2017/0109642 A1 | 4/2017 | Kawale et al. | |
| 2018/0189391 A1 | 7/2018 | Ip et al. | |
| 2018/0224990 A1 | 8/2018 | Shim et al. | |
| 2019/0050128 A1 | 2/2019 | Lee | |
| 2019/0080066 A1 | 3/2019 | Van Os et al. | |
| 2019/0215449 A1 | 7/2019 | Chun et al. | |
| 2019/0238646 A1 | 8/2019 | Edwards et al. | |
| 2020/0004495 A1 | 1/2020 | Dundar et al. | |
| 2020/0042554 A1 | 2/2020 | Liu et al. | |
| 2020/0089724 A1 | 3/2020 | Zimovnov et al. | |
| 2020/0117340 A1 | 4/2020 | Amitay et al. | |
| 2020/0241746 A1 | 7/2020 | Chen et al. | |
| 2020/0267267 A1 | 8/2020 | Kim et al. | |
| 2021/0089574 A1 | 3/2021 | Paul | |

OTHER PUBLICATIONS

Preinterview First Office Action received for U.S. Appl. No. 16/595,267 dated Jul. 1, 2020, 35 pages.

First Action Interview received for U.S. Appl. No. 16/595,267 dated Sep. 2, 2020, 36 pages.

Cao et al., "Systems and Methods for Feature-Based Music Selection", U.S. Appl. No. 16/574,379, filed Sep. 18, 2019, 46 pages.

Spotify, "Daily Mix", URL: https://support.spolify.com/us/using_spotify/discover_music/daily-mix/, as accessed Oct. 21, 2019, pp. 1-3.

Non-Final Office Action received for U.S. Appl. No. 16/555,690 dated Jul. 9, 2020, 20 pages.

Notice of Allowance received for U.S. Appl. No. 16/555,690 dated Oct. 5, 2020, 20 pages.

Paul, Debashish, "Transient Contextual Music Streaming", U.S. Appl. No. 16/555,676, filed Aug. 29, 2019, 54 pages.

Paul, Debashish, "System and Methods for Digitally Fetching Music Content", U.S. Appl. No. 16/581,812, filed Sep. 25, 2019, 44 pages.

Paul, Debashish, "System and Methods for Digitally Proximity-Based Music Stations", U.S. Appl. No. 16/657,008, filed Oct. 18, 2019, 55 pages.

Final Office Action received for U.S. Appl. No. 16/595,267 dated Feb. 24, 2021, 54 pages.

Non-Final Office Action received for U.S. Appl. No. 29/706,940 dated Jan. 25, 2021, 23 pages.

"QR code scanning icon stock illustration", URL: https://www.istockphoto.com/vector/qr-code-scanning-icon-gm1158288755-316352859, istockphoto.com, Jun. 26, 2019, pp. 1-3.

Non-Final Office Action received for U.S. Appl. No. 29/706,941 dated Jan. 25, 2021, 23 pages.

Hardwick, Tim, "How to Sign Up for Apple Music", URL: https://www.macrumors.com/how-to/sign-up-for-apple-music/, macrumors.com, Feb. 13, 2019, pp. 1-4.

Preinterview First Office Action received for U.S. Appl. No. 16/555,676 dated May 5, 2021, 49 pages.

First Action Interview received for U.S. Appl. No. 16/555,676 dated Jun. 24, 2021, 32 pages.

* cited by examiner

US 11,269,952 B1

TEXT TO MUSIC SELECTION SYSTEM

CROSS REFERENCE TO RELATED APPLICATION

This application claims the benefit of U.S. Provisional Application No. 62/871,217, filed 8 Jul. 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
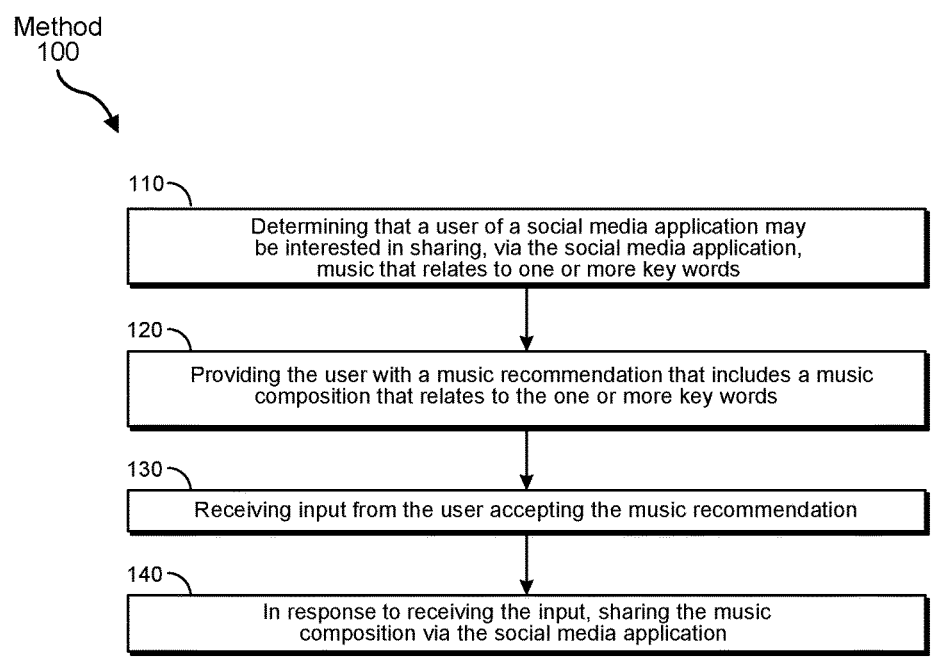
FIG. 1 is a flow diagram of an exemplary method for selecting music recommendations based on text input.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

People all around the world consume music. Some music consumption is a personal experience. Other music consumption is a social experience. The options for music to consume are vast, which may make it difficult or daunting for a user of a music service to select music that is appropriate for a current user need. Responding to this, the present disclosure identifies a need for improved systems and methods for selecting music recommendations for users that are appropriate for their current music needs.

The present disclosure is generally directed to a system for selecting music compositions based on text (e.g., the words "Mother's Day"). In some examples, the system may identify music compositions, based on the text, that a user may be interested in sharing within a social media platform. The music compositions may be intended to be shared within a social media composition (e.g., a newsfeed composition and/or a stories composition and/or a message to be sent via a social media messaging application) and/or a social media profile. In other examples, the system may identify music compositions, based on text, to be added to a playlist (e.g., a playlist with a theme that corresponds to the text) or simply to be consumed in isolation.

The text for a music search may be identified in different ways. In one example, the text may be received via user input to a search tool (e.g., a user text query). In other examples, the text may be automatically extracted from a social media composition being created by the user. The system may rely on a variety of information in identifying music compositions that correspond to the selected text. This information may include words, phrases, and/or one or more musical qualities (e.g., a beat and/or style) of music compositions. In some embodiments, the system may rely on a neural network with a two-tower architecture (e.g., that includes a text tower and a music tower) to identify the music compositions that correspond to selected text.

As will be explained in greater detail below, embodiments of the present disclosure may improve systems for music content selection, allowing computer-based selection models to select music based on one or more key words. The present disclosure may improve the functioning of a computer itself by improving data selection performed by computers. This may also improve the field of heuristic-based music selection, by improving a classifier trained to identify music that relates to one or more key words.

The following will provide, with reference to FIG. 1, detailed descriptions of computer-implemented methods for text-based music selection. Detailed descriptions of corresponding example systems will also be provided in connection with FIG. 2. Additionally, detailed descriptions of exemplary corresponding interfaces will be provided in connection with FIGS. 3-5.

FIG. 1 is a flow diagram of an exemplary computer-implemented method 100 for text-based music selection. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 and/or modules operating in a user device 204 (e.g., as shown in exemplary system 200 in FIG. 2).

Server 202 generally represents any type or form of backend computing device that performs one or more social networking functions as part of a social media platform 206 that manages server 202. Although illustrated as a single entity in FIG. 2, server 202 may include and/or represent a group of multiple servers that operate in conjunction with one another. User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, a user 208 of user device 204 may be a member of social media platform 206. In these examples, user device 204 may have installed an instance of a social media application 210 that operates as part of social media platform 206. Additionally or alternatively, user device 204 may have installed a browser that may navigate to one or more webpages maintained by social media platform 206.

Social media platform 206 may provide a variety of services for the users within its network (e.g., user 208). In one example, social media platform 206 may provide a newsfeed service. The term "newsfeed" may generally refer to any type or form of social media consumption channel that presents a scrollable collection of newsfeed compositions. In some examples, a newsfeed may scroll (e.g., upward or downward) to reveal different compositions within the newsfeed, in response to receiving user scrolling input. In one example, the scrollable collection may include a collection of newsfeed compositions created by contacts of a particular user (e.g., friends of the particular user). The term "newsfeed composition" as used herein generally refers to any type or form of composition that may be displayed in a newsfeed. Newsfeed compositions may include, without limitation, text-based compositions, media-based compositions (which may include either a single media item or a collage of multiple media items), and/or a link to an online article.

As another example, social media platform 206 may provide a digital story service. The digital story service may provide users with a story consumption channel, which presents a continuous series of digital story compositions to a story-consumer, one by one. In one example, the story consumption channel may transition from presenting one digital story composition to the next automatically, without requiring any user input to do so. In some examples, a digital story composition may only be viewable for a predetermined amount of time. For example, a digital story composition may be set to disappear after twenty-four hours. The term "digital story composition" may generally refer to any type or form of social media composition intended for a story consumption channel. A digital story composition may include a variety of content (e.g., a digital photograph, a graphic, text, a digital video and/or a digital recording of a music composition). In some examples, digital story compositions from a same source (e.g., created and/or posted by a same user) may be grouped together within the story consumption channel, such that each digital story composition from a particular source is displayed prior to displaying digital story compositions from another source.

As another example, social media platform 206 may provide a messaging service. The term "messaging service" may generally refer to any type or form of digital message delivery system that enables users of social media platform 206 to exchange messages (e.g., private messages between two or more users). These messages may include a variety of content (e.g., a text, link, live video, voice recordings, etc.) and may take a variety of forms (e.g., e-mail, text message, group chat, etc.).

In some examples, social media platform 206 may provide a music service 212 that enables users such as user 208 to share and/or consume music via social media platform 206. Music service 212 may provide music in a variety of ways. In one example, music service 212 may provide music in response to a direct user request. For example, music service 212 may receive a user request for a particular music composition and may provide the requested music composition in response to receiving the request (e.g., by playing the requested music composition and/or making the requested music composition available for sharing). In another example, music service 212 may create and/or maintain one or more music stations for user 208.

The term "music station" may refer to any type or form of digital container that stores a queue of music compositions that may be played via a music player provided by music service 212. In some examples, the queue may represent an evolving queue and music compositions may continually be added to the queue in real time (e.g., as the music compositions within the queue are being played). In other examples, the queue may represent a designated set of music compositions (e.g., a playlist). In some examples, the queue may be filled with music compositions that correspond to a particular genre of music and/or that relate to a common theme.

Music compositions may be manually added to a music station via user input, may be automatically added (e.g., based on one or more key words and/or based on deduced user preferences), or a combination. In examples in which a music station includes an evolving queue of music, music service 212 may create a music station based on an initial user input (e.g., a user request to play music compositions that relate to a particular genre, artist, and/or theme). Music service 212 may determine which music compositions to include in a music station in a variety of ways, as will be discussed in greater detail below following the discussion of step 140.

Music service 212 may operate within social media platform 206 in a variety of ways. In one embodiment, music service 212 may operate as a passive layer that operates in the background of another service provided by social media platform 206 and/or as a supplemental feature of another service provided by social media platform 206.

Figure 3:
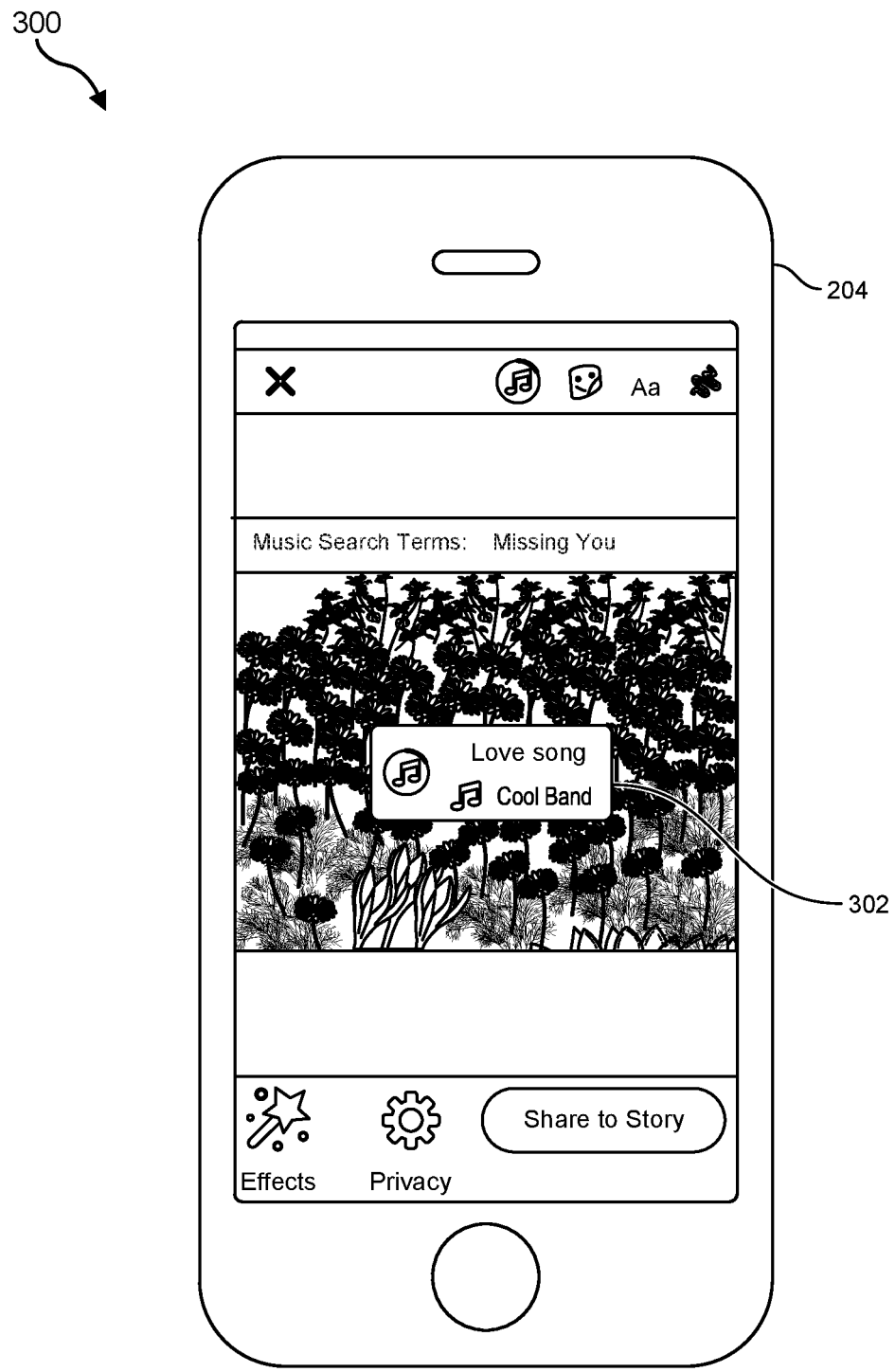
FIG. 3 is an illustration of an exemplary composition interface, which enables a user to add music content to a social media composition.

For example, music service 212 may operate as a passive layer within a digital story service and/or a newsfeed service. As a specific example, a composition interface that enables user 208 to create a digital story and/or a newsfeed composition may include a selectable element that enables user 208 to add music to the digital story and/or newsfeed composition. FIG. 3 provides an illustration of an exemplary composition interface 300, which enables user 208 to add music content 302 (a song entitled "Love Song") to a social media composition. In the specific example in FIG. 3, user 208 may have submitted a digital image of flowers as a base image for the social media composition. User 208 may also have submitted the search terms "missing you," to search for music content relating to the search terms. In response, music service 212 may have selected and provided music content 302, using the systems and methods that will be described in greater detail below in connection with steps 110-140.

Figure 4:
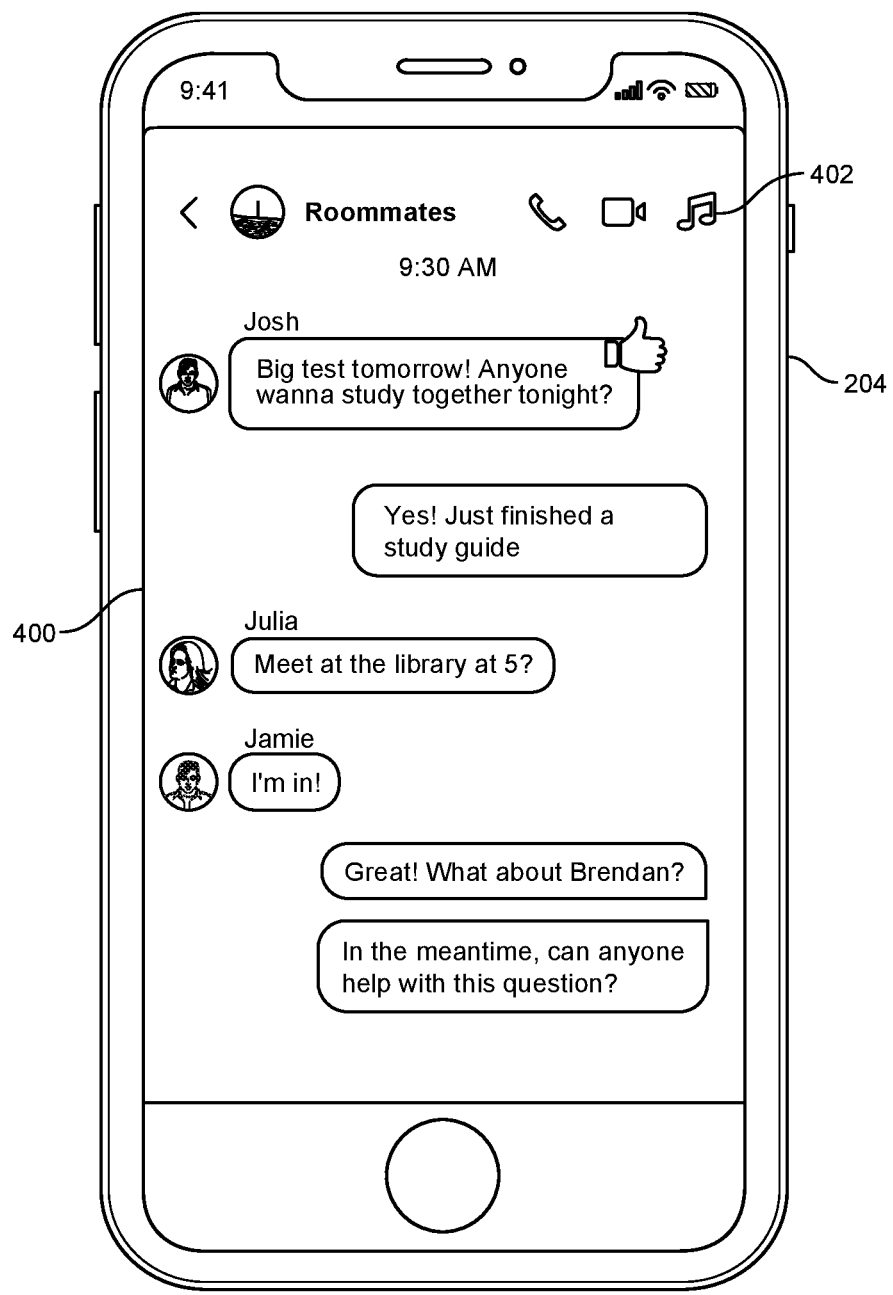
FIG. 4 is an illustration of an exemplary group chat interface, which facilitates shared music listening experiences for users in a group.

In another example, music service 212 may operate as a passive layer within a messaging service. In this example, a messaging interface that enables user 208 to create private messages for one or more additional users may include a selectable element that enables user 208 to share music in the private messages. FIG. 4 provides an illustration of an exemplary messenger interface 400 with a selectable music element 402 configured to enable user 208 to add music to a message displayed within messenger interface 400.

Figure 5:
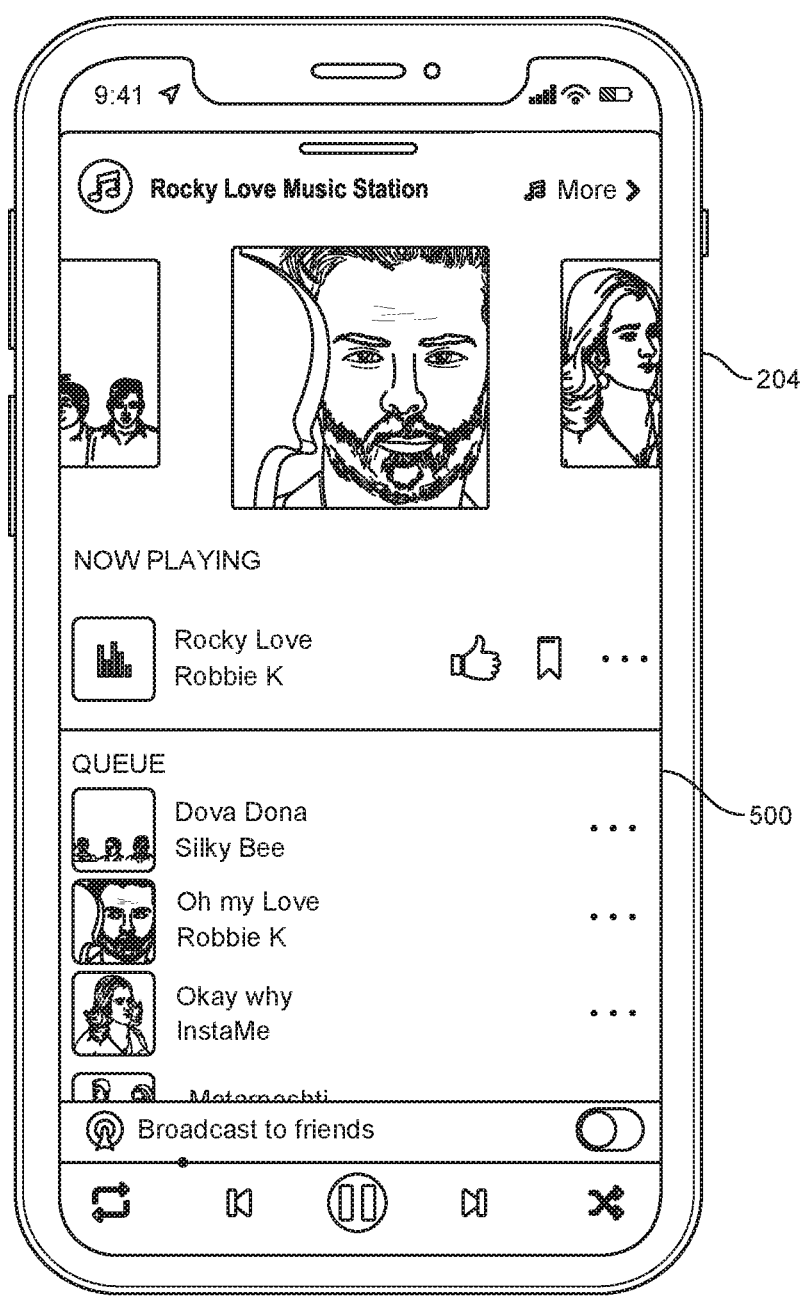
FIG. 5 is an illustration of an exemplary player interface.

In addition, or as an alternative, to operating as a passive layer within social media platform 206, music service 212 may operate as part of an active layer within social media platform 206 (e.g., within an active-layer interface or set of active-layer interfaces dedicated to music consumption and/or music sharing). The active-layer interface may represent any type or form of interface dedicated to music consumption and/or sharing. In some examples, the active-layer interface may represent a player interface corresponding to a music player. Player interface 500 in FIG. 5 provides one specific example of an active-layer player interface used to play music compositions within a music station.

Social media platform 206 may maintain a variety of data for user 208. For example, social media platform 206 may maintain a personal profile for user 208, which may include a variety of user 208's information (e.g., a current city, a workplace, a school, a hometown, etc.). Additionally, social media platform 206 may maintain a database of user 208's contacts, which have been added via social media platform 206. In some examples, social media platform 206 may maintain a user history for user 208. For example, social media platform 206 may maintain an archive of content posted and/or consumed by the user 208 (e.g., social media compositions, digital photographs, music, messages, etc.) and/or comments and/or digital responses made to content posted by other users.

Figure 2:
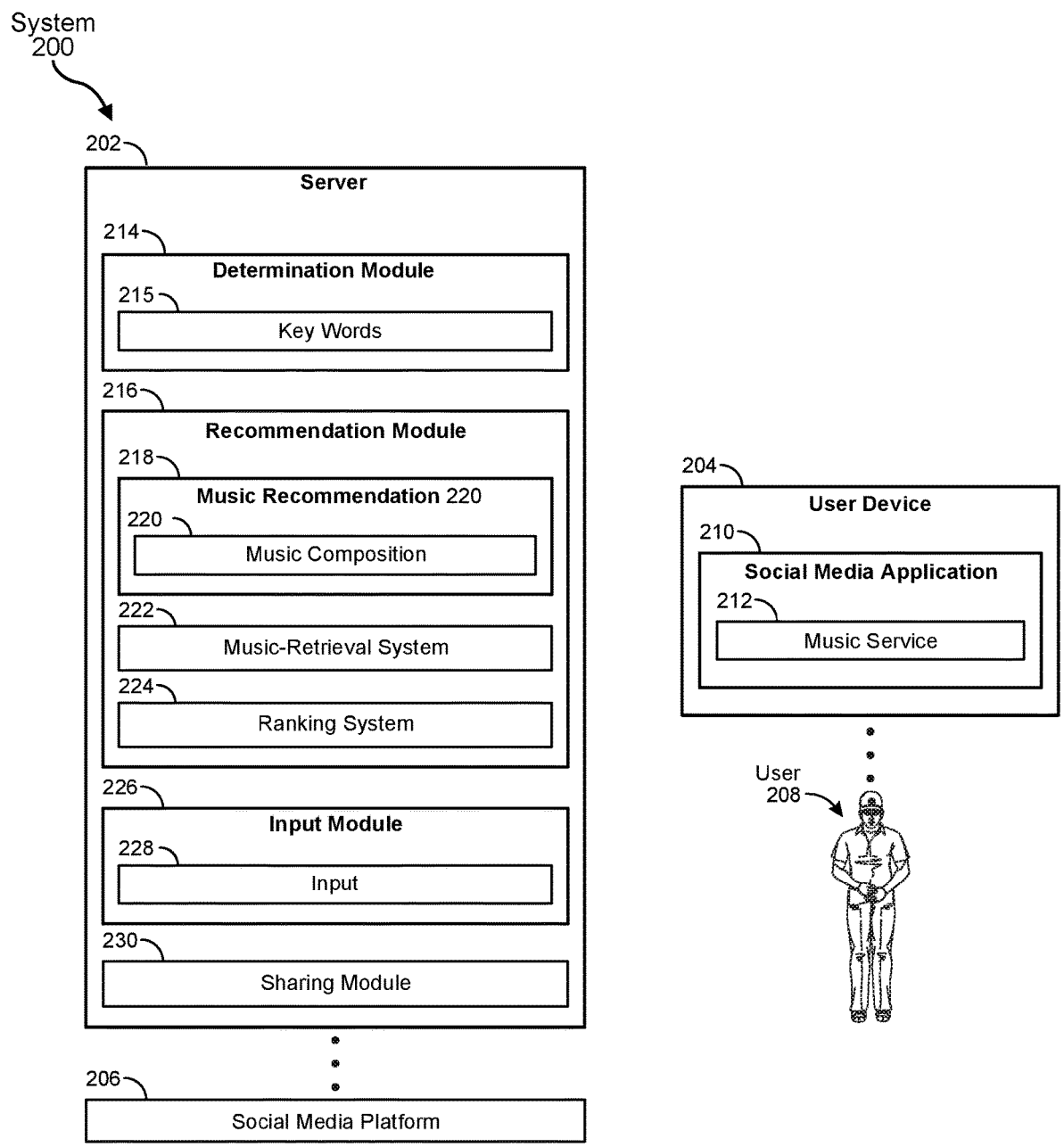
FIG. 2 is a block diagram of an exemplary system for selecting music recommendations based on text input.

Returning to FIG. 1, at step 110, one or more of the systems described herein may determine that a user of a social media application may be interested in sharing, via the social media application, music that relates to one or more key words. For example, as illustrated in FIG. 2, a determination module 214 may determine that user 208 may be interested in sharing, via social media application 210, music that relates to one or more key words 215.

Determination module 214 may determine that user 208 may be interested in sharing music relating to key words 215 in a variety of ways. In some examples, determination module 214 may determine that user 208 may be interested in sharing music based on user input signaling user 208's interest. For example, determination module 214 may determine that user 208 may be interested in sharing music in response to receiving user input requesting a music sharing recommendation (e.g., input to a search element dedicated to searching for music). In this example, the user input (e.g., to the search element) may include key words 215. For example, the user input may request a music sharing recommendation together with the search terms "Mother's Day."

In some examples, determination module 214 may (1) receive user input initiating the creation of a social media composition (e.g., a newsfeed composition, a digital story composition, and/or a private message) and (2) deduce that user 208 may be interested in adding music to the social media composition in response to receiving the user input initiating the creation of the social media composition. In this example, determination module 214 may identify key words 215 from text submitted for the social media composition. As a specific example, determination module 214 may identify the text "On this day, so grateful to have the very best mom" added to a social media composition being created by user 208. Then, determination module 214 may deduce, based on the text, that user 208 may be interested in adding, to the social media composition, music appropriate for Mother's Day (i.e., music related to the words "Mother" and/or "Mother's Day."

In a related example, determination module 214 may determine that user 208 may be interested in sharing music in response to receiving user input that initiates adding music to a profile of user 208 within social media application 210 (e.g., that includes key words 215). Additionally or alternatively, determination module 214 may (1) receive user input adding or modifying data within user 208's profile, (2) deduce that user 208 may be interested in adding music to his or her profile, (3) identify text within the profile, and (4) extract and/or deduce key words 215 from the identified text.

Returning to FIG. 1, at step 120, one or more of the systems described herein may provide the user with a music recommendation that includes a music composition that relates to the one or more key words. For example, as illustrated in FIG. 2, a recommendation module 216 may provide user 208 with a music recommendation 218 that includes a music composition 220 that relates to key words 215.

Recommendation module 216 may select music composition 220 for music recommendation 218 in a variety of ways (e.g., in response to a variety of determinations). In some examples, recommendation module 216 may select music composition 220 in response to (1) identifying one or more features of music composition 220 and (2) determining that the features coincide with key words 215. Recommendation module 216 may identify a variety of music composition 220's features, such as a music feature (a tempo, beat, type, and/or key), a lyrical feature (e.g., a word, set of words, and/or phrase included within music composition 220's lyrics), an artist associated with music composition 220, a context of music composition 220 (e.g., an era during which music composition was created), etc. In some examples, recommendation module 216 may additionally identify features of key words 215 (e.g., themes and/or additional words related to key words 215).

Recommendation module 216 may determine that music composition 220's features coincide with key words 215 in a variety of ways. In some embodiments, recommendation module 216 may rely on a music-retrieval system 222 (e.g., a neural network). In these examples, music-retrieval system 222 may combine the features described above to generate one or more feature tables. The feature tables may then be used to build one or more embeddings (e.g., a music embedding based on music compositions 220's features and/or a text embedding based on features of key words 215). As used herein, the term "embedding" may refer to an n-dimensional vector with a meaningful geometry.

Music-retrieval system 222 may use the embeddings in a variety of ways. For example, in one embodiment, music-retrieval system 222 may represent a two-tower model with a music tower and a text tower. In this example, music-retrieval system 222 may create a text embedding (i.e., the text tower of the two-tower model) for key words 215 and a music embedding (i.e., the music tower of the two-tower model) for each candidate music composition within a group of candidate music compositions. Then, music-retrieval system 222 may compare a closeness of the text embedding with each of the music embeddings to identify music compositions (such as music composition 220) that most closely relate to key words 215 (e.g., based on a relative closeness of each music embedding to the text embedding).

In some examples, recommendation module 216 may additionally select music composition 220 based on a user-preference determination. In these examples, recommendation module 216 may further select music composition 220 in response to (1) identifying one or more features of user 208 indicative of user 208's music preferences and (2) determining that user 208 is likely to enjoy music composition 220 based on user 208's music preferences. Recommendation module 216 may determine user 208's music preferences based on a variety of user features. For example, recommendation module 216 may determine user 208's preferences based on user 208's usage history with social media platform 206 (e.g., a viewing history, a commenting history, a posting history, etc.) and/or with music service 212 (e.g., a music consumption and/or sharing history).

Recommendation module 216 may use the identified user features to determine that user 208 is likely to enjoy music composition 220 in a variety of ways. For example, music-retrieval system 222 may further create a user embedding for user 208 (e.g., based on the user features described above) and compare the user embedding against each of the music embeddings to identify music compositions (such as music composition 220) that user 208 is likely to enjoy (e.g., based on a relative closeness of each music embedding to the user embedding).

In some examples, recommendation module 216 may obtain multiple recommended music compositions from music-retrieval system 222 (e.g., including music composition 220). In these examples, recommendation module 216 may apply the recommended music compositions from music-retrieval system 222 to a ranking system 224. In response, ranking system 224 may rank each recommended music composition.

Ranking system 224 may rank the recommended music compositions in a variety of ways. In some examples, ranking system 224 may rank the recommended music composition based on a relative closeness of the text embedding and/or user embedding to each of the music embeddings. Additionally or alternatively, ranking system 224 may rank the recommended music compositions based on a probability that user 208 will share the recommended music composition (e.g., calculated based on a relative closeness of the text embedding and/or user embedding to each of the music embeddings and/or a history of music shared by user 208 in the past).

In one embodiment, ranking system 224 may additionally randomize the recommended music compositions (e.g., using Thompson sampling and/or a Gumbel-Max variation on Thompson sampling). Randomizing the recommended music compositions may provide user 208 with variety (i.e., so that user 208 doesn't receive the same recommendations each time user 208 is given a recommendation). Then, recommendation module 216 may provide user 208 with a designated number of the music compositions that have been selected and ordered based on the rankings assigned by ranking system 224 (e.g., music composition 220).

The two-tower model described above is one of many machine learning models that recommendation module 216 may rely on to identify music recommendation 218. As another specific example, recommendation module 216 may rely on a graph convolution model.

Returning to FIG. 1, at step 130, one or more of the systems described herein may receive input from the user accepting the music recommendation. For example, as illustrated in FIG. 2, an input module 226 may receive input 228 from user 208 accepting music recommendation 218 (e.g., by selecting music composition 220 for sharing).

Input module 226 may receive input 228 in a variety of ways. In some embodiments, input module 226 may receive input 228 via an auxiliary device, such as a keyboard and/or a digital mouse. Additionally or alternatively, input module 226 may receive input 228 via a touchscreen. In some examples, input 228 may represent a selection of music composition 220. For example, input 228 may select music composition 220 to be included within a social media composition, as a profile song, within a digital comment to another user's social media composition, and/or within a private message.

In response to receiving the input, one or more of the systems described herein may share the music composition via the social media application (step 140 in FIG. 1). For example, as illustrated in FIG. 2, a sharing module 230 may share music composition 220 within social media platform 206 (e.g., via social media application 210).

Sharing module 230 may share music composition 220 in a variety of ways, depending on the context in which determination module 214 determined user 208's interest in sharing music. For example, in examples in which determination module 214 detected user 208's interest in response to receiving user input initiating the creation of a social media composition, sharing module 230 may share music composition 220 by (1) adding music composition 220 to the social media composition (e.g., in response to receiving input 228) and (2) posting and/or sending the social media composition (e.g., in response to receiving user posting input to a composition interface and/or message interface being used to create the social media composition). As another example, in examples in which determination module 214 determined that user 208 may be interested in selecting music for a profile, sharing module 230 may share music composition 220 by posting music composition 220 to user 208's profile.

In addition, or as an alternative, to providing user 208 with a music recommendation for sharing music, the present disclosure may include systems and methods for providing user 208 with a music recommendation for consuming music related to key words 215. In these examples, determination module 214 may determine that user 208 may be interested in consuming music relevant to key words 215. This determination may be made in response to a direct user request for a music consumption recommendation. Alternatively, determination module 214 may deduce that user 208 may be interested in consuming music based on a trigger event. For example, determination module 214 may detect that user 208 is driving and may deduce that user 208 may be interested in consuming music based on the detection.

Then, recommendation module 216 may provide user 208 with a music-consumption recommendation that includes one or more music compositions, such as music composition 220, related to key words 215. Recommendation module 216 may rely on a variety of determinations in selecting the music compositions, such as the determinations described above in connection with step 120. In some examples, recommendation module 216 may rely on a music-retrieval system with the same architecture described above in connection with music-retrieval system 222, but which is configured to identify music compositions for consumption (e.g., rather than sharing and/or in addition to sharing). In some such examples, recommendation module 216 may also rely on a ranking system, such as ranking system 224 described in connection with step 120, to rank and/or randomize the music consumption recommendations obtained from the music-retrieval system.

In some examples, a player module (not depicted in FIG. 2) may automatically play consumption recommendations for user 208 in response to receiving recommendations from a music-retrieval system and/or ranking system. Alternatively, the player module may play the recommended music for user 208 in response to receiving affirmative user input requesting to play the same. In one embodiment, the player module may add the recommended music to a music station for user 208 and may play the recommended music in response to receiving user input to play the music within the music station.

As described throughout the present disclosure, the disclosed systems and methods may provide systems and methods for text-based music selections. In one example, a computer-implemented method may include (1) determining that a user of a social media application may be interested in sharing, via the social media application, music that relates to one or more key words, (2) providing the user with a music recommendation that includes a music composition that relates to the one or more key words, (3) receiving input from the user accepting the music recommendation, and (4) in response to receiving the input, sharing the music composition via the social media application.

In some examples, determining that the user may be interested in sharing music may include receiving user input requesting a music sharing recommendation and/or user input that initiates adding music to a profile of the user within the social media application. In these examples, the user input may include the one or more key words. Additionally or alternatively, determining the user's interest in sharing music may include (1) receiving user input initiating the creation of a social media composition (e.g., a newsfeed composition, a digital story composition, and/or a private digital message), (2) deducing that the user may be interested in adding music to the social media composition, and (3) identifying the one or more key words from text submitted for the social media composition.

In some examples, providing the music recommendation may include using a music-retrieval system to identify the music composition that relates to the one or more key words. In one such example, the music-retrieval system may include a neural network. In some examples, the neural network may represent a two-tower model that includes a text tower and a music tower.

In examples in which the method includes using a music-retrieval system, providing the music recommendation may further include (1) identifying music compositions identified by the music-retrieval system, (2) applying the music compositions to a ranking system that ranks each composition within the music compositions based on a probability that the user will share the composition, and (3) providing the user with a designated number of the music compositions that have been selected and ordered based on the rankings assigned by the ranking system. In some embodiments, the method may further include randomizing the music compositions.

In one example, a corresponding system for implementing the above-described method may include (1) a determination module, stored in memory, that determines that a user of a social media application may be interested in sharing, via the social media application, music that relates to one or more key words, (2) a recommendation module, stored in memory, that provides the user with a music recommendation, including a music composition, that relates to the one or more key words, (3) an input module, stored in memory, that receives input from the user accepting the music recommendation, (4) a sharing module, stored in memory, that shares the music composition via the social media application in response to the input module receiving the input, and (5) a physical processor configured to execute the determination module, the recommendation module, the input module, and the sharing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine that a user of a social media application may be interested in sharing, via the social media application, music that relates to one or more key words, (2) provide the user with a music recommendation that relates to the one or more key words, (3) receive input from the user accepting the music recommendation, and (4) in response to receiving the input, share the music composition via the social media application.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    determining that a user of a social media application may be interested in sharing, via the social media application, music that relates to one or more key words;
    using a two-tower neural network comprising a text tower and a music tower to identify a plurality of music compositions that relate to the one or more key words by (1) creating a text embedding for the one or more key words, based on one or more features of the key words, and, (2) for each music composition within the plurality, (i) creating a music embedding for the music composition based on one or more musical features of the music embedding, (ii) comparing a closeness of the text embedding with the music embedding, and (iii) identifying the music composition based on a closeness of the music composition's music embedding to the text embedding relative to a closeness of the text embedding to the music embeddings of one or more other music compositions within a group of candidate music compositions;
    applying the plurality of music compositions to a ranking system that (1) ranks each music composition within the plurality based on a probability that the user will share the music composition and (2) randomizes the plurality of music compositions;
    providing the user with a music recommendation comprising a designated number of the plurality of music compositions that have been selected and ordered based on rankings assigned by the ranking system;
    receiving input from the user accepting a music composition from the music recommendation; and
    in response to receiving the input, sharing the accepted music composition via the social media application.

2. The computer-implemented method of claim 1, wherein determining the user's interest in sharing music comprises receiving user input requesting a music sharing recommendation.

3. The computer-implemented method of claim 2, wherein the user input requesting a music sharing recommendation comprises the one or more key words.

4. The computer-implemented method of claim 1, wherein determining the user's interest in sharing music comprises:
    receiving user input initiating the creation of a social media composition;
    deducing that the user may be interested in adding music to the social media composition; and
    identifying the one or more key words from text submitted for the social media composition.

5. The computer-implemented method of claim 4, wherein the social media composition comprises at least one of:
    a newsfeed composition;
    a digital story composition; or
    a private digital message.

6. The computer-implemented method of claim 1, wherein determining the user's interest in sharing music comprises receiving user input that initiates adding music to a profile of the user within the social media application.

7. The computer-implemented method of claim 6, wherein the user input that initiates adding music to the profile comprises the one or more key words.

8. The computer-implemented method of claim 1, wherein the one or more musical features comprise at least one of a tempo, a beat, a music type, or a key.

9. The computer-implemented method of claim 1, wherein the music embedding for a music composition is further based on one or more lyrical features of the music composition.

10. The computer-implemented method of claim 9, wherein the lyrical features of the music composition comprise at least one of a word, a set of words, or a phrase included in the music composition.

11. The computer-implemented method of claim 1, wherein the music embedding for a music composition is further based on an era during which the music composition was created.

12. A system comprising:
    a determination module, stored in memory, that determines that a user of a social media application may be interested in sharing, via the social media application, music that relates to one or more key words;
    a recommendation module, stored in memory, that:
        uses a two-tower neural network comprising a text tower and a music tower to identify a plurality of music compositions that relate to the one or more key words by (1) creating a text embedding for the one or more key words, based on one or more features of the key words, and, (2) for each music composition within the plurality, (i) creating a music embedding for the music composition based on one or more musical features of the music embedding, (ii) comparing a closeness of the text embedding with the music embedding, and (iii) identifying the music composition based on a closeness of the music composition's music embedding to the text embedding relative to a closeness of the text embedding to the music embeddings of one or more other music compositions within a group of candidate music compositions; and
        applies the plurality of music compositions to a ranking system that (1) ranks each music composition within the plurality based on a probability that the user will share the music composition and (2) randomizes the plurality of music compositions;
        provides the user with a music recommendation comprising a designated number of the plurality of music compositions that have been selected and ordered based on rankings assigned by the ranking system;
    an input module, stored in memory, that receives input from the user accepting a music composition from the music recommendation;
    a sharing module, stored in memory, that, in response to the input module receiving the input, shares the accepted music composition via the social media application; and at least one physical processor configured to execute the determination module, the recommendation module, the input module, and the sharing module.

13. The system of claim 12, wherein the determination module determines the user's interest in sharing music in response to receiving user input requesting a music sharing recommendation.

14. The system of claim 12, wherein the determination module determines the user's interest in sharing music by:
   receiving user input initiating the creation of a social media composition;
   deducing that the user may be interested in adding music to the social media composition; and
   identifying the one or more key words from text submitted for the social media composition.

15. The system of claim 14, wherein the social media composition comprises at least one of:
   a newsfeed composition;
   a digital story composition; or
   a private digital message.

16. The system of claim 12, wherein the determination module determines the user's interest in sharing music in response to receiving user input that initiates adding music to a profile of the user within the social media application.

17. The system of claim 12, wherein the one or more musical features comprise at least one of a tempo, a beat, a music type, or a key.

18. The system of claim 12, wherein the music embedding for a music composition is further based on one or more lyrical features of the music composition.

19. The system of claim 18, wherein the lyrical features of the music composition comprise at least one of a word, a set of words, or a phrase included in the music composition.

20. A non-transitory computer-readable medium comprising one or more computer-readable instructions that, when executed by at least one processor of a computing device, cause the computing device to:
   determine that a user of a social media application may be interested in sharing, via the social media application, music that relates to one or more key words;
   uses a two-tower neural network comprising a text tower and a music tower to identify a plurality of music compositions that relate to the one or more key words by (1) creating a text embedding for the one or more key words, based on one or more features of the key words, and, (2) for each music composition within the plurality, (i) creating a music embedding for the music composition based on one or more musical features of the music embedding, (ii) comparing a closeness of the text embedding with the music embedding, and (iii) identifying the music composition based on a closeness of the music composition's music embedding to the text embedding relative to a closeness of the text embedding to the music embeddings of one or more other music compositions within a group of candidate music compositions;
   apply the plurality of music compositions to a ranking system that (1) ranks each music composition within the plurality based on a probability that the user will share the music composition and (2) randomizes the plurality of music compositions;
   provide the user with a music recommendation comprising a designated number of the plurality of music compositions that have been selected and ordered based on rankings assigned by the ranking system;
   receive input from the user accepting a music composition from the music recommendation; and
   in response to receiving the input, share the accepted music composition via the social media application.

\* \* \* \* \*